Nov. 17, 1936.  A. R. THOMPSON  2,061,051
FRUIT PITTER
Filed Jan. 15, 1934  2 Sheets-Sheet 1

Inventor
Albert R. Thompson
By Lyon & Lyon
Attorneys

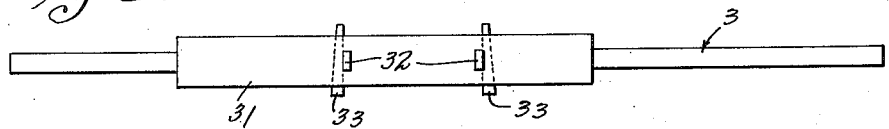
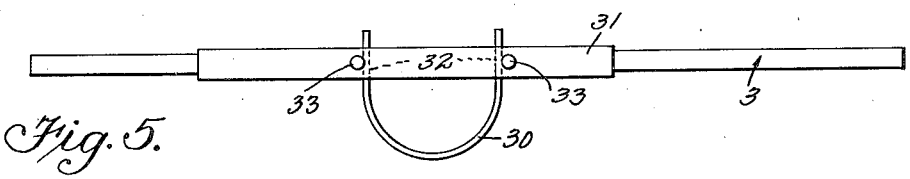
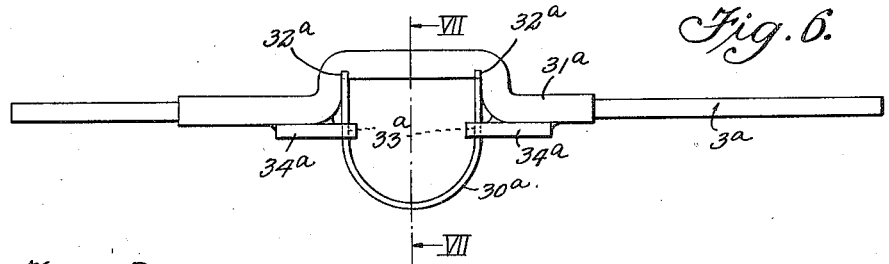
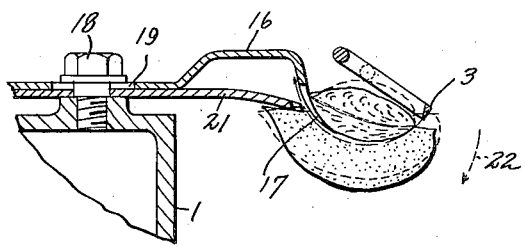
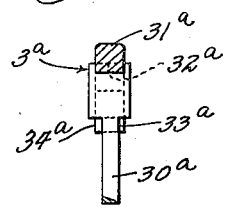
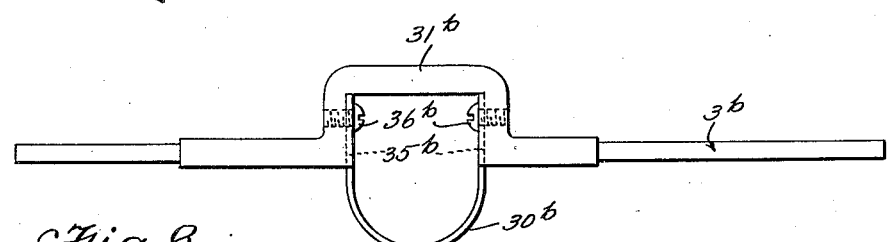

Patented Nov. 17, 1936

2,061,051

UNITED STATES PATENT OFFICE 2,061,051

FRUIT PITTER

Albert R. Thompson, San Jose, Calif., assignor to Pacific Machinery Company, San Francisco, Calif., a corporation of California Application January 15, 1934, Serial No. 706,645

5 Claims. (Cl. 146—28)

This invention relates to pitting machines, and more particularly to a machine and method for the removal of pits or cores from previously halved or split fruit.

It is an object of this invention to provide a method of pitting or coring previously halved or split fruit wherein the pit of the fruit is located with reference to an impaling member, and a curved pitting knife, in such a manner that the half of the fruit may be shifted or rotated with reference to the impaling member manually by an operator to bring the edges of the pit within the path of operation of the curved pitting knife so that the curved pitting knife may cut the pit or core from the flesh of the fruit with a minimum of waste of pulp of the fruit.

Another object of this invention is to provide a method of pitting or coring halved fruit in which a previously halved or split fruit is positioned by engagement of the pit with an impaling member in such a manner as to permit a half of the fruit to be rotated or shifted relative to the impaling member so as to shift the half pit or core of the fruit to within the radius of operation of a curved pitting knife.

Another object of this invention is to provide a device for removing the core or pit from a half fruit including an impaling member and a pitting member in which machine the half fruit is adapted to be engaged with reference to the impaling member manually at the start of the operation of removing the core or pit from the fruit in such a manner that the operation of the coring or pitting member will retain the half fruit in position with reference to the impaling member during the operation of removing the pit or core.

Other objects and advantages of this invention it is believed will be apparent from the following detailed description of a preferred embodiment thereof as illustrated in the accompanying drawings.

In the drawings:

Figure 3 is a diagrammatic view illustrating the manner of pitting a fruit as embodying my invention and illustrating in dotted lines the manner in which the half of the fruit may be pitted or shifted to bring the pit or core of the fruit within the radius of operation of the pit removing means.

Figure 4 is a detached elevation of a fruit pitting blade embodied in my invention.

Figure 5 is a top plan view thereof.

Figure 6 is a top plan view of a modified form of pitting blade embodying my invention.

Figure 7 is a sectional end view taken substantially on the line 7—7 of Figure 6.

Figure 8 is a plan view of a modified form of pitting knife embodying my invention.

Figure 1:
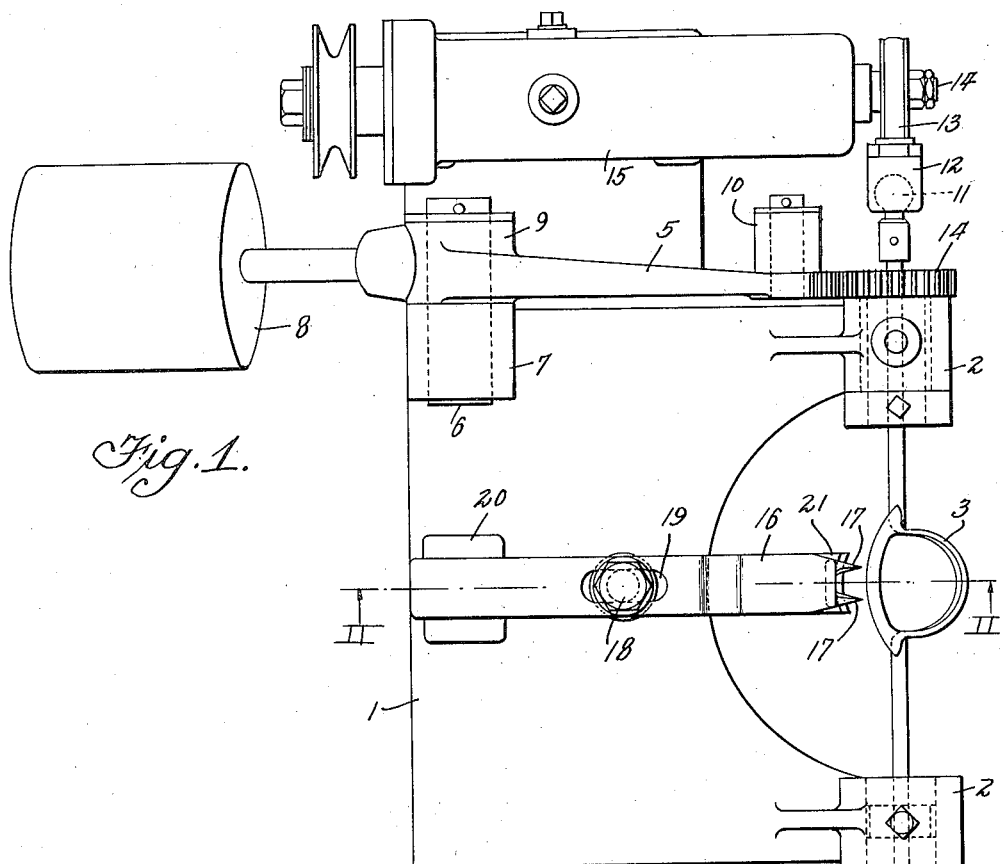
Figure 1 is a top plan view of a fruit pitting and coring member embodying my invention.
Figure 2:
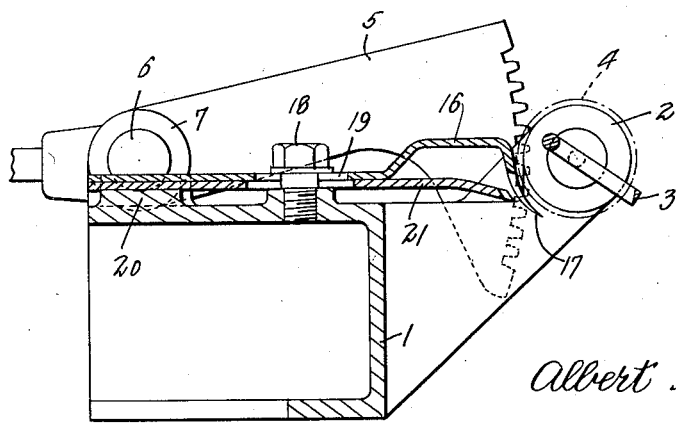
Figure 2 is an end elevation thereof.

In the preferred embodiment of my invention as illustrated in the accompanying drawings, 1 indicates a frame which may be attached to any suitable or desirable form of support or table to position the same with reference to an operator, preferably so as to permit the operator to be seated during the operation of the device.

Formed on the frame 1 are two outwardly extending bearing bosses 2 for supporting bearings in which the shanks of the pitting knife 3 are rotatably supported in such manner as to permit movement of the shanks of the pitting knife longitudinally during their rotation. Secured to one shank of the pitting knife 3 is a pinion 4 which pinion 4 is adapted to mesh with a rack 5 for rotating the pitting knife preferably through 180° to remove the half pit or core from a previously split or halved fruit such, for example, as from a clingstone peach. The rack 5 is pivotally supported on a pivot pin 6 which is carried in a boss 7 secured to the frame 1.

In order to actuate the pitting knife 3 to drive the same around the pit, a weight 8 is provided, carried by the bearing collar 9 of the rack 5, and is supported in such position as to cause the pitting knife to be driven through the flesh of the fruit. In order to return the pitting knife 3 to the starting pitting position as illustrated in Figure 3, a treadle is secured to the rack 5 as illustrated at 10 and extends downwardly to a position adjacent the floor so as to enable the pitting blade 3 to be returned to the starting position by the foot of the operator so that when the operator releases his or her foot, the weight 8 will drive the pitting knife around the pit of the fruit.

In order to vibrate the pitting knife 3 during its cutting operation one shank of the pitting knife is secured to a ball connecting member 11 which is retained within a socket 12, which socket 12 is operatively connected with an eccentric 13. The eccentric 13 is journaled upon a vibrator shaft 14. The vibrator shaft 14 is supported on bearings within a housing 15 secured to the frame 1. The shaft 14 is driven from any suitable or desirable source such, for example, as from an electric motor or from a line shaft and is preferably driven at the rate of approximately 3000 to 3500 R. P. M. The stroke of movement of the knife 3 caused by the eccentric 13 is relatively short so that there is set up in the knife 3 a vibration in the direction of the axis of the shanks of the knife 3.

In order to position the half fruit with relation to the pitting knife 3, there is provided a supporting or forked member 16 which extends downwardly to provide downwardly extending curved prongs 17 which are adapted to be engaged in the flesh of the fruit to be pitted immediately adjacent the core of the fruit within the flesh of the fruit by the operator who holds the half of the fruit in his hand and engages the prongs 17 in the flesh of the fruit against the pit thereof. The operator then depresses the treadle to cause the pitting knife to rotate and the pitting knife 3 rotates in a direction toward the prongs 17, and during the operation of the pitting knife 3 the action set up between the rotation of the pitting knife 3 and the prongs 17 acts to hold the half of the fruit in pitting position so that the operator may then grip another half fruit preparatory to pitting the same. As the pitting knife passes around the pit of the fruit it passes outside of the prongs 17 and follows the curvature of the prongs to cut from the flesh of the fruit the portion of the fruit in which the prongs 17 had been impaled. As soon as the half of the fruit is thus cut away from the pit, the half of the fruit will drop into a basket or other container. The operator then releases the treadle, permitting the weight 8 to return the pitting knife to its starting position and the pit of the fruit drops from the device.

In order to permit the positioning of the impaling member 16 with reference to the pitting knife 3 so as to adjust the same properly for pitting knives of different radii, the supporting member 16 is secured to the frame 1 adjustably by means of a cap screw 18 which passes through a slot 19 formed in the bar of the member 16 and is threaded to the frame 1. The rear end of the bar of the member 16 fits within a recess formed in a holding block 20 formed integral with the frame 1 so as to prevent rotation of the member 16 around the cylindrical portion of the cap screw 18.

In order to cause the pitting knife 3 to make a clean cut as it passes to the rear of the prongs 17 and in order to hold the half of the fruit in position until the end of the pitting operation and to prevent the flesh of the fruit from breaking away at the end of the cut of the pitting knife so that a clean and definite cut is formed around the pit of the fruit, I prefer to locate to the rear of the prongs 17 of the member 16 a shear member 21 which is supported on the frame 1 by the cap screw 18 and within the recesses formed in the holding block 20. The shear member 21 may be adjusted in position in the same manner as the member 16.

The method of pitting bifurcated or split fruit embodying my invention is diagrammatically illustrated in Figure 3. In accordance with the method embodying my invention, the operator grips a half fruit in his hand and impales the prongs 17 into the flesh of the fruit immediately adjacent the blossom end of the pit with the point of the pit extended between the prongs 17. The pit of the fruit is then in position of visibility of the operator who can visually determine whether the pitting blade 3 will pass around the pit of the fruit or is in correct position with relation to the pitting knife 3 so that the pitting knife 3 will cut the pit of the fruit from the flesh with the removal of a minimum amount of the flesh of the fruit. If, on observation, the operator determines that the pit of the fruit is not in the path of operation of the pitting knife, he may bring the pit of the fruit in such position by rotating the forward portion of the half of the fruit downwardly as indicated in dotted line 22 in Figure 3, thereby bringing the forward edge of the pit into position where the pitting knife will pass around the flesh of the fruit. As the pitting knife is rotated the operator may then swing the half of the fruit upwardly so that the pitting knife will pass completely around the pit of the fruit closely following the curvature of the pit to cut the flesh away from the pit of the fruit without cutting away any excess portion of the pulp of the fruit.

In this manner it will be observed that in locating or determining the starting position of the pitting knife the half of the fruit is positioned with relation to the prongs 17 so as to enable the half of the fruit to be tilted or swung with reference to the prongs 17 to bring the pit into pitting position. After the operator has swung the half of the fruit in correct position for the start of the pitting operation, he depresses the treadle, causing the pitting knife to rotate. As the pitting knife is rotated, it is vibrated by the vibratory method as above described so that as the pitting knife is swung around the pit of the fruit through the flesh of the fruit, it is continuously vibrated so that a clean cut is made through the flesh of the fruit.

In Figures 4 and 5 I have illustrated one form of pitting knife embodying my invention in which the curved portion 30 of the pitting knife 3 is removably and replaceably secured to the body portion 31 so that when desired the cutting portions of the knife may be replaced as desired. The curved portion of the knife 30 is secured to the bar portion 31 by passing the same through receiving slots 32 formed in the bar portion 31 and by wedging the same in position by means of tapered pins 33.

In the modified form of my invention as illustrated in Figures 6 and 7, the curved portion 30a of the pitting knife 3a is secured to the body portion 31a by having the ends of the curved portion 30a fit within receiving slots 32a and having the straight or flat portions of the curved member 30a fit within driving slots or notches 33a formed in the driving bars 34a.

In the modified form of my invention as illustrated in Figure 8, the pitting knife 3b is formed with the curved cutting portion 30b having an extended straight portion 35b which fits within grooves formed in the body 31b. Screws 36b are threaded in the body portion 31b after passing through holes formed in the straight portions 35b of the curved cutting portion 30b so that the curved cuting portion of the knife is removably held with relation to the body of the knife. In each of the modified forms of my invention it will be observed that the curved or cutting portion of the pitting knife is removably secured to the cutting portion so that should the curved or cutting portion of the knife break during operation it may be easily and readily removed during operation and replaced. It will also be observed that the portion of the knives which are subject to wear or breakage during the operation of the machine are a minimum portion of the blades so that the expense of their removal or replacement is brought to a minimum.

Having fully described my invention, it is to be understood that I do not wish to be limited

I claim:

1. A pitting machine for pitting or coring half fruit including a member shaped to be engaged manually within the flesh of a half fruit to engage the edge of the pit of the fruit, a rotatable curved pitting knife, the member permitting pivoting of the half fruit to regulate the point at which the curved pitting knife enters the fruit, and means adapted to be actuated by the operator for rotating the curved pitting knife when the half fruit has been shifted to position to bring the pit within the path of movement of the pitting knife.

2. A peach pitting apparatus including a bifurcated member upon which a half peach is adapted to be manually impaled adjacent the pit thereof, a curved pitting knife positioned to swing toward the said member, means for swinging the pitting knife so that the pitting knife cuts close to the edge of the pit as the knife emerges from the flesh of the peach and passes over the said member.

3. In a device for pitting halved fruit, the combination of a bifurcated pivot member onto which a half fruit is adapted to be manually impaled with the halved surface of the half fruit uppermost to permit visibility of the pit of the fruit, a pitting knife, means for rotating the pitting knife to cause the same to pass through the flesh of the fruit to cut the pit from the flesh of the fruit, and the bifurcated impaling member being so formed and impaled within the flesh of the fruit as to permit tilting of the halved fruit to determine the point of entry of the pitting knife into the flesh of the fruit adjacent the pit of the fruit and so as to enable the operator to tilt the fruit during operation of the pitting knife to cause the pitting knife to pass through the flesh of the fruit adjacent the pitting knife so that a minimum of the flesh of the fruit is cut away with the pit.

4. In a peach pitting device, the combination of a bifurcated member upon which a previously halved fruit is adapted to be manually positioned adjacent the pit of the fruit, a curved pitting knife positioned to swing through the flesh of the fruit and over the said member, and means for rotating the curved pitting knife to cause the same to pass through the flesh of the fruit to the rear of the said member to sever the pit of the fruit and the portion of the flesh of the fruit in which the member is impaled in the fruit.

5. In a peach pitting device, the combination of a pivot member having curved prongs against which a previously halved fruit is adapted to be manually engaged, a curved pitting knife, means for rotating the curved pitting knife, and a shear member positioned to the rear of the said pivot member and the pitting knife being adapted to pass between the pivot member and the shear member during operation of cutting the pit from the flesh of the fruit.

ALBERT R. THOMPSON.